INVENTOR
PETER G. BARTLETT
BY
Meyer, Tilberry & Body
ATTORNEYS

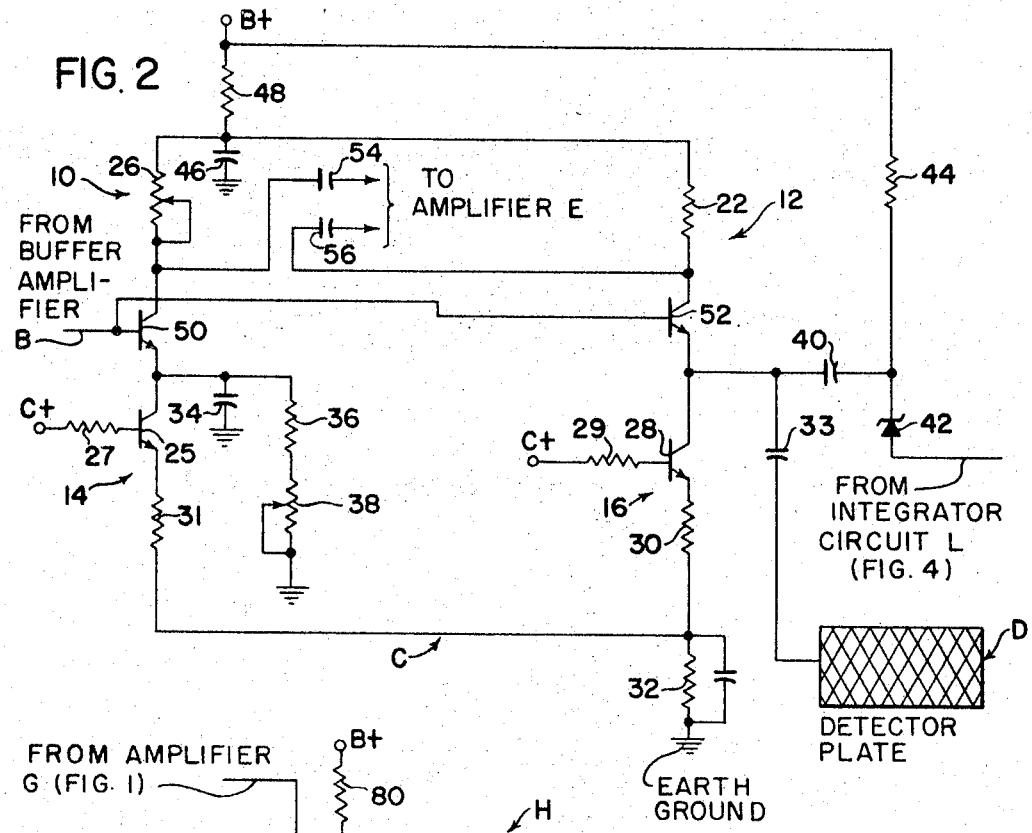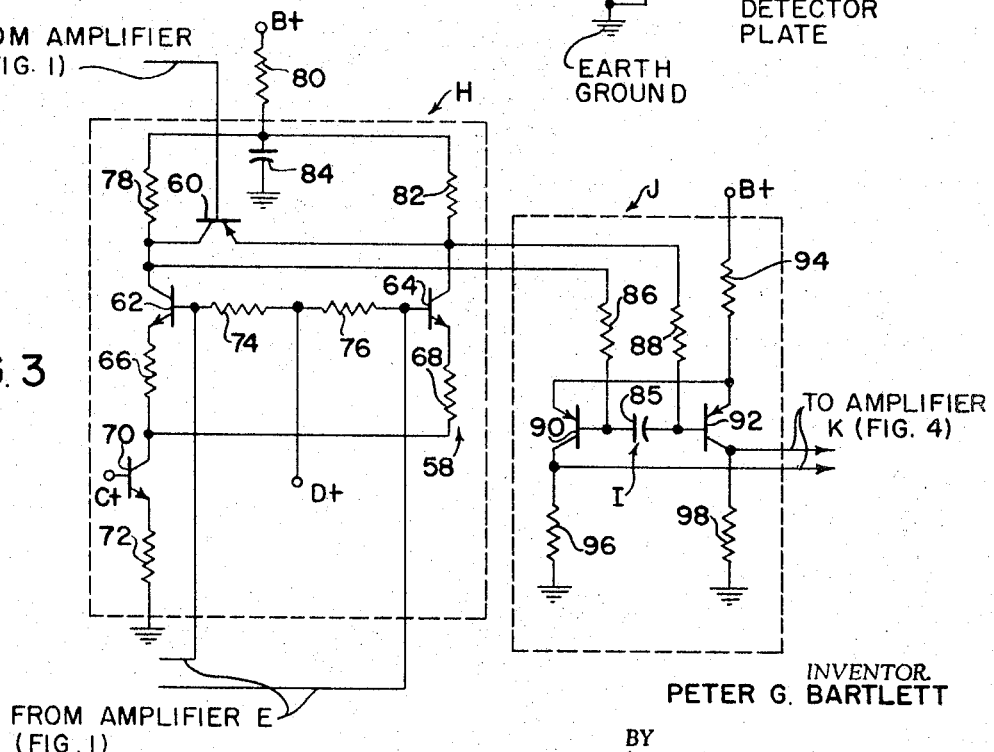

Aug. 19, 1969
P. G. BARTLETT
3,462,692
PEDESTRIAN DETECTION SYSTEM

Filed March 27, 1967
6 Sheets-Sheet 3

INVENTOR
PETER G. BARTLETT
BY
Meyer, Tilberry & Body
ATTORNEYS

Aug. 19, 1969   P. G. BARTLETT   3,462,692
PEDESTRIAN DETECTION SYSTEM
Filed March 27, 1967   6 Sheets-Sheet 5
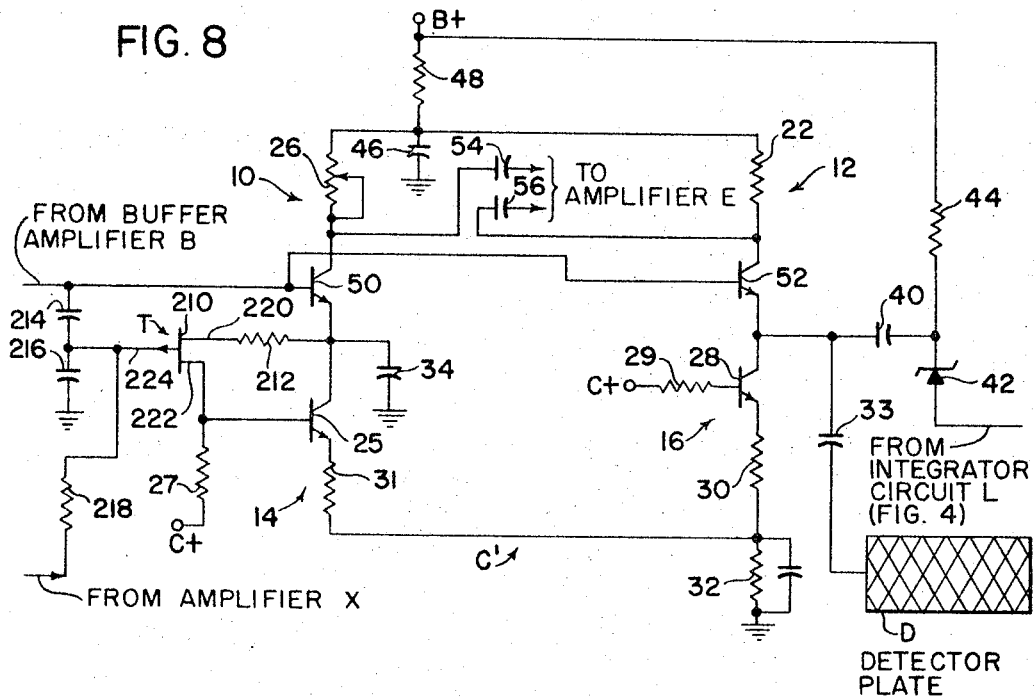
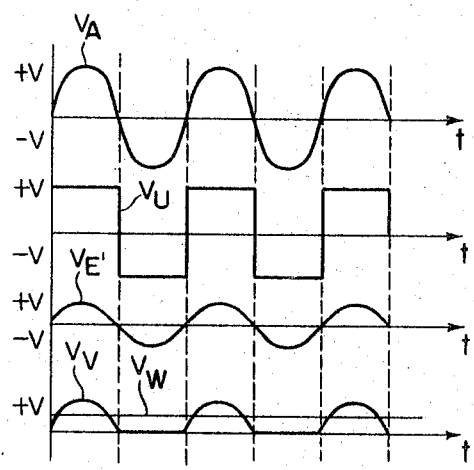
FIG. 9
INVENTOR.
PETER G. BARTLETT
BY
Meyer, Tilberry & Body
ATTORNEYS

United States Patent Office

3,462,692
Patented Aug. 19, 1969

3,462,692
PEDESTRIAN DETECTION SYSTEM
Peter G. Bartlett, Bettendorf, Iowa, assignor to E. W. Bliss Company, Canton, Ohio, a corporation of Delaware
Filed Mar. 27, 1967, Ser. No. 626,335
Int. Cl. G08b 13/26, 13/00; H03k 3/02
U.S. Cl. 328—5                                7 Claims

ABSTRACT OF THE DISCLOSURE

A detection system for detecting the presence of an object, such as a pedestrian, with a sensing device, such as an electrically conductive plate, exhibiting a variable capacitance with respect to earth ground. The sensing device is coupled to one arm of a normally balanced capacitance bridge, having an input circuit coupled to an oscillator providing a reference voltage frequency signal relative to earth ground, and an output circuit for providing an output frequency voltage signal when the bridge becomes unbalanced due to a change in the variable capacitance in response to the presence of an object. A compensating device is coupled to another arm of the bridge for rebalancing the bridge under the control of a compensating control circuit.

---

The present invention is directed toward the art of object detectors and, more particularly, to an improved self-balancing object detector system.

The invention is particularly applicable for use in conjunction with detecting the presence of pedestrians and will be described with particular reference thereto; although, it is to be appreciated that the system may be used for detecting the presence of other objects.

This invention is similar to my joint invention with Donald Henry, as disclosed in our United States patent application, Ser. No. 613,257, filed Feb. 1, 1967, assigned to the same assignee as the present invention, and the disclosure of that application is herein incorporated by reference. That application discloses an object detection system, which is particularly applicable for use in conjunction with detecting metallic objects, such as vehicles. Basically, the disclosed circuitry includes: a sensing device in the form of an inductive loop having a variable inductive reactance which decreases in value in response to the presence of a vehicle. An oscillator provides a reference frequency voltage signal for application to a normally balanced inductive reactance impedance bridge. The bridge has an input circuit for receiving the reference frequency voltage signal, and an output circuit for carrying an output frequency voltage signal representative of a bridge unbalanced condition. The inductive loop is coupled to one arm of the bridge and a variable capacitor is coupled to an opposite arm of the bridge. A compensating control circuit serves, in response to a bridge unbalanced condition, to decrease the value of the variable capacitor to thereby rebalance the bridge.

The present invention is directed toward detecting the presence of an object, such as a pedestrian, which need not exhibit a metallic mass. This is accomplished by sensing whether the presence of an object causes a change in the capacitance between earth ground and an electrically conductive detector plate.

Prior to the present invention pedestrian detectors utilizing the capacitive detection principle operated with either a resonant circuit or a high impedance input circuit coupled to a power source. Both of these approaches suffer from the fact that resistive leakage to earth ground from the detector plate reduces the systems sensitivity. These and other disadvantages of previous pedestrian detectors are overcome by the present invention which utilizes low impedance, non-resonant circuits.

In accordance with the present invention, the object detection system comprises a sensing device, such as an electrically conductive plate, having a variable capacitance with respect to earth ground, and which capacitance increases in value in response to the presence of an object, such as a pedestrian; oscillator means for providing a reference frequency voltage signal relative to earth ground; a normally balanced capacitance bridge having four bridge arms, an input circuit coupled to the oscillator means for receiving the reference frequency voltage signal and an output circuit for carrying an output frequency voltage signal representative of a bridge unbalanced condition; the sensing device being coupled to one of the arms of the bridge so that the bridge output circuit carries an output frequency voltage signal when the variable capacitance increases in value; compensating means coupled to the bridge for compensating for the change in the value of the variable impedance to return the bridge to a balanced condition; and, compensating control circuit means coupled to the bridge output circuit and the compensating means for actuating the compensating means to return the bridge to a balanced condition in response to a bridge output frequency voltage signal.

In accordance with a still more limited aspect of the present invention, the compensating means includes a voltage control variable capacitance device connected in parallel with one of the arms of the bridge.

The primary object of the present invention is to provide a self-balancing object detection system which detects the presence of objects by sensing variations in capacitance between a sensing plate and earth ground.

It is a still further object of the present invention to provide an object detector system which is self-balancing so as to tune out a pedestrian which may be stationary in the detection zone, and thereafter continue to be in response to the presence of additional pedestrians.

It is a still further object of the present invention to provide a detector system wherein presence timing of the system is independent of the strength of the detection signal.

It is a still further object of the present invention to provide a detector system which is operated at a low frequency and in a non-resonant mode.

The foregoing and other objects and advantages of the invention will become apparent from the following description of the preferred embodiment of the invention as read in connection with the accompanying drawings in which:

FIGURE 2 is a schematic circuit diagram illustrating a capacitance bridge circuit;

FIGURE 3 is a schematic circuit diagram illustrating demodulator and a direct current differential amplifier;

FIGURE 8 is a schematic illustration of a capacitance bridge circuit used in the embodiment illustrated in FIGURE 7;

FIGURE 9 is a graph of wave forms of voltage versus time illustrating another aspect of the operation of the invention;

Figure 1:
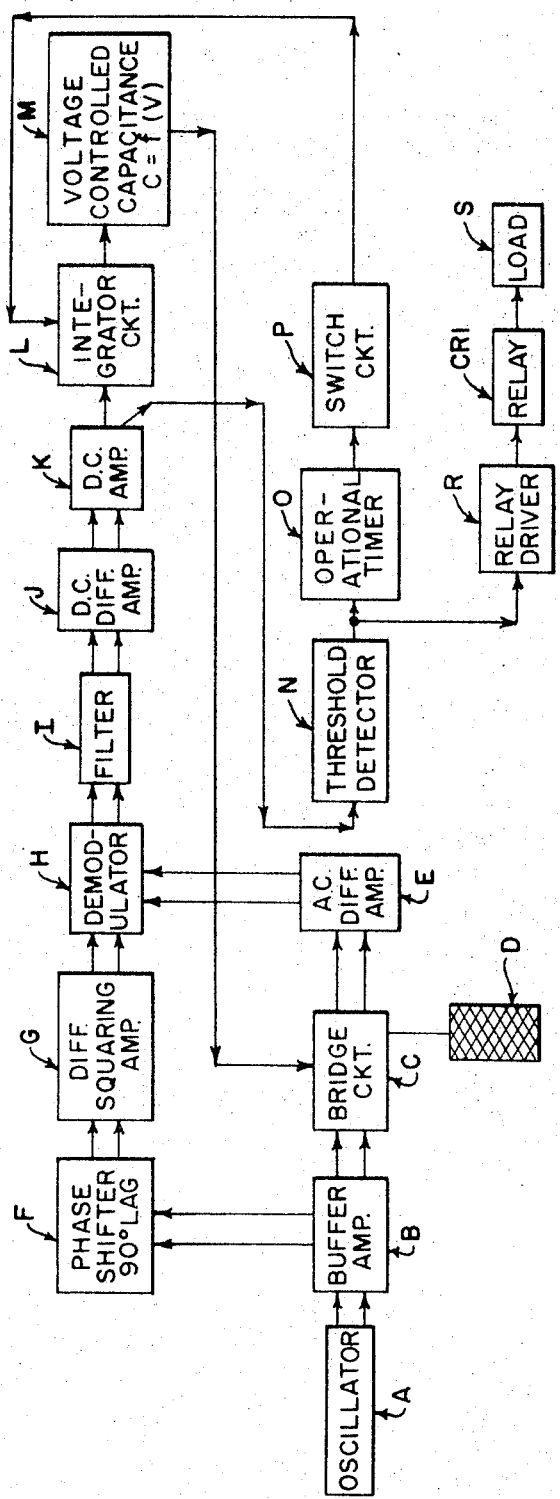
FIGURE 1 is a block diagram illustration of the preferred embodiment of the invention.

Referring now to the drawings, and more particularly to FIGURE 1, there is illustrated in block diagram form a preferred embodiment of the pedestrian detector system including an oscillator A, a buffer amplifier B, an impedance bridge circuit C, a detector plate D, an AC differential amplifier E, a 90° phase shifter F, a differential squaring amplifier G, a demodulator H, a filter I, a direct current differential amplifier J, a direct current amplifier K, an integrator circuit L, a voltage contol capacitance device M, a threshold detector N, an operational timer O, a switch circuit T, a relay driver R, a relay CR1 and a load S. Thus, the preferred embodiment of the detector system generally includes: a sensing device, such as detector plate D; oscillator means including oscillator A; a normally balanced capacitance bridge C, having four arms, one being coupled to the plate D, an input circuit coupled to oscillator A through amplifier B; compensating means including the voltage controlled capacitance device M; compensating control circuit means including circuits E, F, G, H, I, J, K, L, N, O and P; and, a detector output means including relay driver R, relay CR1 and load S.

Oscillator A may take various forms, but preferaby includes a standard transistorized Colpitts oscillator which provides, at its output circuit, a low frequency reference voltage signal of sinusoidal wave form and of around four volts peak to peak. The buffer amplifier B serves as a buffer stage between oscillator A and the phase shifter circuit F and bridge circuit C. Bridge circuit C, as will be described in greater detail with reference to FIGURE 2, takes the form of a capacitance bridge having four arms, of which one is coupled both to a detector plate D as well as to the votage controlled capacitance device M. The bridge output circuit is coupled to an AC differential amplifier E. The output circuit of amplifier E is coupled to a demodulator circuit H, to be described in greater detail hereinafter with reference to FIGURE 3. The output circuit of buffer amplifier B is coupled to a phase shifter circuit F, which serves to shift the reference frequency signal by 90°, lagging. The shifted reference signal is then applied to a differential squaring amplifier G, which may take any suitable form and serves to square up the sinusoidal output wave from the oscillator in a symmetrical fashion, so that the square wave output signal is 90° out of phase and lagging with respect to the oscillator output signal. The square wave signal is then applied to demodulator H, where the bridge output signal is demodulated by the squared up and phase shifted reference signal to obtain an alternating signal indicative of the increase in the capacitance reactance between plate D and earth ground. The low frequency portion of this output signal is passed by filter I as a direct current voltage, having a value representative of the change in the capacitive reactance. The output of filter I is amplified by the direct current differential amplifier J, to be described in detail hereinafter with reference to FIGURE 3. The output of differential amplifier J is amplified by a DC amplifier K and integrated by integration circuit L. The amplifier output signal of amplifier K is applied to threshold detector N, where, if the signal is sufficiently great, a relay driver R is actuated to de-energize normally energized relay CR1 coupled to load S. The output of threshold detector N is also coupled to an operational timer O, which, after a predetermined period of time, actuates a switch circuit P which serves to actuate the integrator circuit L. The integrator circuit L, when actuated, serves to apply a voltage to the voltage controlled capacitor device M, which, in turn, serves to rebalance bridge circuit C, to thereby tune out the change in the capacitive reactance. Circuits K, L, N, O, P, device M, relay driver R, relay CR1 and load S are described in greater detail hereinafter with reference to FIGURE 4.

DETECTOR PLATE

Figure 10:
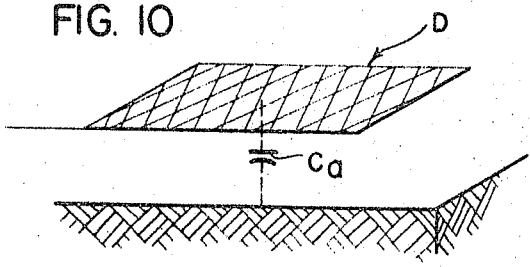
FIGURE 10 is a schematic illustration of a pedestrian detector plate.
Figure 11:
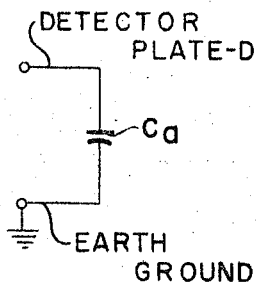
FIGURE 11 is an equivalent circuit of FIGURE 10.
Figure 12:
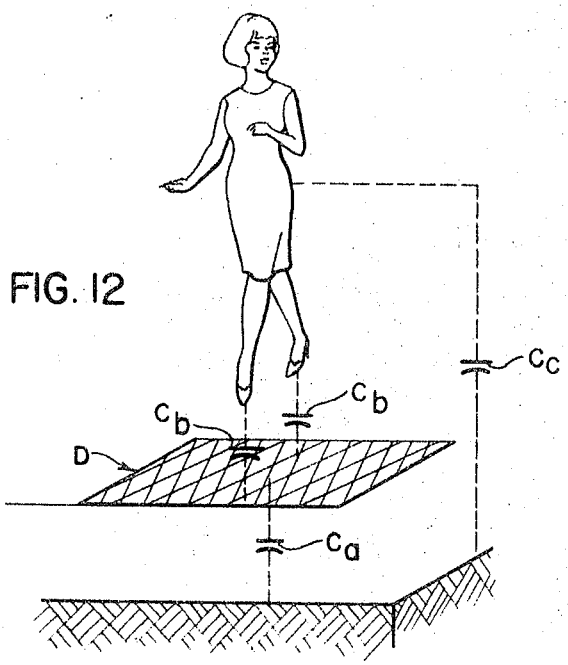
FIGURE 12 is similar to FIGURE 10 with the inclusion of a pedestrian.
Figure 13:
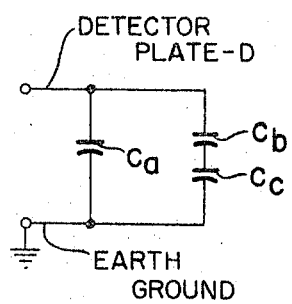
FIGURE 13 is an equivalent circuit of FIGURE 12.
Figure 14:
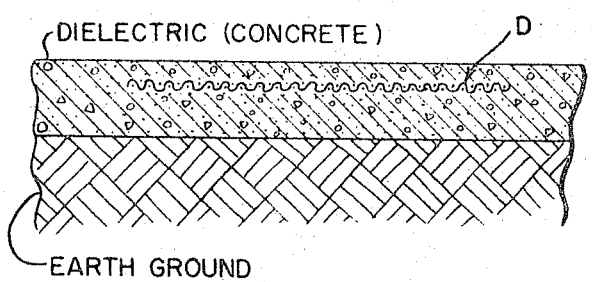
FIGURE 14 shows the manner of installation of the detector plate.

The detector plate D, as shown in FIGURES 10, 12 and 14, preferably takes the form of an electrically conductive wire mesh screen. If desired, the plate may take other forms, such as an electrically conductive, solid plate. The plate is installed on a sidewalk or a roadbed so that it generally defines a horizontal plane. Normally, as shown in FIGURE 14, plate D is installed in a dielectric medium, such as concrete, which overlies earth ground. In the absence of a pedestrian, plate D exhibits a capacitance $Ca$ with reference to earth ground potential, as represented by the equivalent circuit shown in FIGURE 11. The value of capacitance $Ca$ is dependent on such factors as the distance and dielectric medium between the plate and reference level of earth ground potential. As shown in FIGURE 12, when a pedestrian walks over plate D, the total capacitance increases by the value of the capacitance $Cb$ between the plate and the pedestrian, as well as the capacitance $Cc$ between the pedestrian and earth ground. The equivalent circuit, during the presence of a pedestrian, is shown in FIGURE 13.

CAPACITIVE IMPEDANCE BRIDGE CIRCUIT

The impedance bridge circuit C, as schematically illustrated in FIGURE 2, includes four bridge arms 10, 12, 14 and 16. Arm 10 includes a variable resistor 26. Arm 12 includes a fixed resistor 22. Arm 14 includes a normally conductive, constant current source, NPN transistor 25 having its base connected to a C+ voltage supply source through resistor 27, and its emitter connected to ground through series resistors 31 and 32. A relatively small capacitor 34, which may be on the order of 0.0027 microfarad, is connected between the collector of transistor 25 and ground. A fixed resistor 36 and a bridge balancing resistor 38 are connected together in series across capacitor 34. Arm 16 includes a normally conductive, constant current source, NPN transistor 28 having its base connected to a C+ voltage supply source through resistor 29 and its emitter connected to earth ground through series connected resistors 30 and 32. A large capacitor 33, which may be on the order of 0.1 microfarad, is connected between the collector of transistor 28 and the detector plate D. A large capacitor 40, which may be on the order of 0.01 microfarad, couples the junction of capacitor 33 and collector of transistor 28 with the cathode of a Zener diode 42, which serves as a voltage controlled variable capacitance device. The junction capacitance of Zener diode 42 is small, such as on the order of 0.001 microfarad, relative to capacitor 33. The junction of the cathode of Zener diode 42 and capacitor 40 is connected through a resistor 44 to a B+ voltage supply source. The junction of resistors 22 and 26 is connected to ground through a capacitor 46, as well as to the B+ voltage supply source through a resistor 48. Resistor 26 is connected in series with transistor 25 by means of an NPN transistor 50, having its collector connected with resistor 26 and its emitter connected to the collector of transistor 25. Similarly, resistor 22 is connected in series with transistor 28 by means of an NPN transistor 52, having its collector connected with resistor 22 and its emitter connected to the collector of transistor 28. The base of transistor 50 and the base of transistor 52 are connected together in common so that the input circuit of the bridge is taken between ground and the common base connection of transistors 50 and 52. The bridge input circuit is coupled across the output circuit of buffer amplifier B for receiving therefrom a sinusoidal alternating current frequency signal. The output circuit of bridge C is taken between the collectors of transistors 50 and 52 and is coupled to amplifier E through coupling capacitors 54 and 56.

DEMODULATOR

Demodulator H, as schematically illustrated in FIGURE 3, includes a differential amplifier 58 having a demodulating PUP transistor 60 connected across its output circuit. Amplifier 58 includes a pair of NPN transistors 62 and 64, having their emitters connected through resistors 66 and 68 to the collector of a normally conductive, constant current source, NPN transistor 70. Transistor 70 has its emitter connected to ground through a resistor 72 and its base connected to the C+ voltage supply source. The base electrodes of transistors 62 and 64 are connected through resistors 74 and 76, respectively, to a D+ voltage supply source. Preferably, the C+ voltage supply source is on the order of +4 volts and the B+ voltage supply source is on the order of +24 volts, while the D+ voltage supply source being at a positive value between the other two sources. The collector of transistor 62 is connected through a resistor 78 and a resistor 80 to the B+ voltage supply source. Similarly, the collector of transistor 64 is connected through a resistor 82 and then through a resistor 80 to the B+ voltage supply source. Similarly, the collector of transistor 64 is connected through a resistor 82 and then through a resistor 80 to the B+ voltage supply source. The junction of resistors 78 and 82 is connected to ground through a capacitor 84. PNP transistor 60 has its emitter connected to the collector of transistor 64 and its collector connected to the collector of transistor 62. The output from amplifier G, FIGURE 1, is applied to the base of transistor 60 so that a square wave, shifted 90° lagging with respect to the reference frequency signal provided by oscillator A, is applied to transistor 60. The input circuit to differential amplifier 58 is taken between collectors 62 and 64 and is connected across the output circuit of the AC differential amplifier E. The output circuit of demodulator H is taken across the collectors of transistors 62 and 64 and applied to the filter I.

FILTER AND AC DIFFERENTIAL AMPLIFIER

The filter I includes a capacitor 85 connected across the output circuit of demodulator H through resistors 86 and 88. Differential amplifier J, as schematically illustrated in FIGURE 3, includes a pair of PNP transistors 90 and 92, having their emitters connected in common and thence through a resistor 94 to a B+ voltage supply source. The collector of transistor 90 is connected through a resistor 96 to ground and the collector of transistor 92 is connected through a resistor 98 to ground. The output circuit of differential amplifier J is taken across the collectors of transistors 90 and 92 and applied to amplifier K.

DC AMPLIFIER

Figure 4:
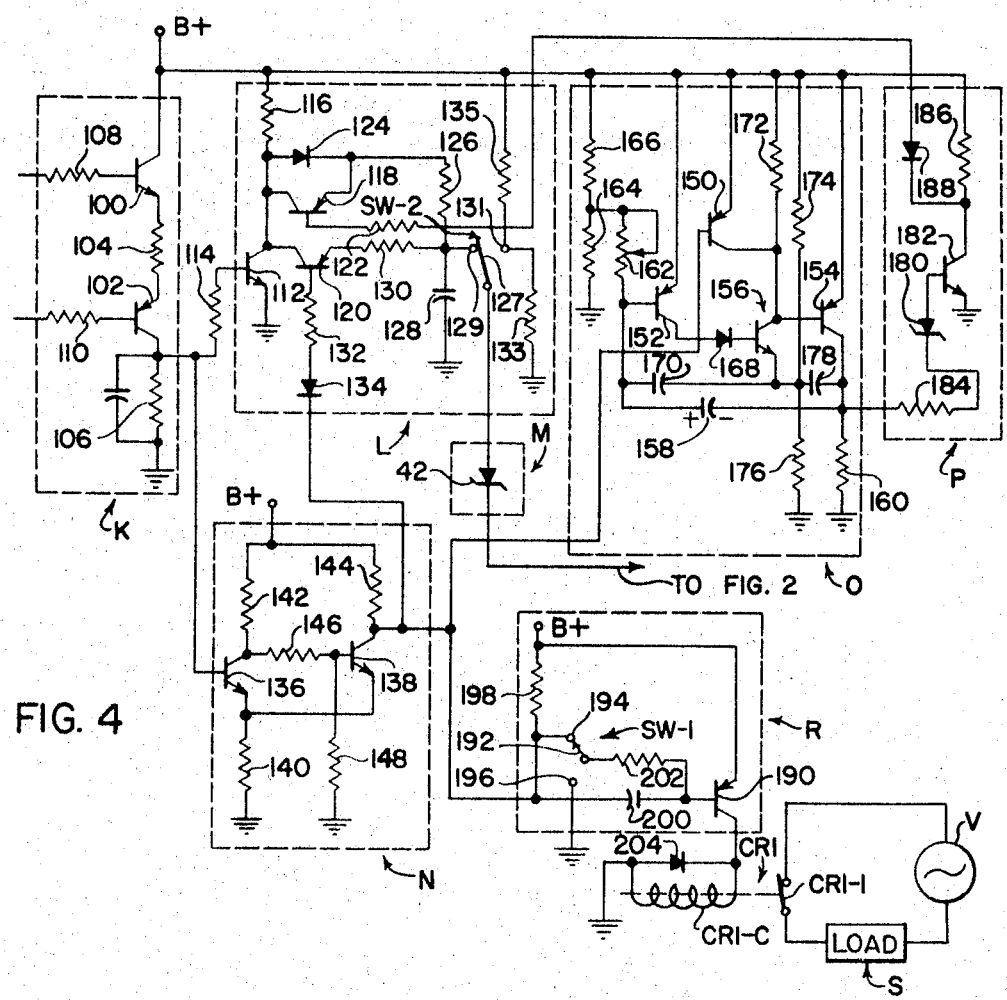
FIGURE 4 is a schematic circuit diagram illustrating a direct current amplifier, an integrator circuit, an operational timer, a switch circuit, a threshold detector circuit and a relay driver circuit.

DC amplifier K, as schematically illustrated in FIGURE 4, includes an NPN transistor 100 and a PNP transistor 102, having their emitters connected together through a resistor 104. The collector of transistor 100 is connected to the B+ voltage supply source and the collector of transistor 102 is connected through a resistor 106 to ground. The base of transistor 100 is connected through a resistor 108 to the collector of transistor 92 in amplifier J, and the base of transistor 102 is connected through a resistor 110 to the collector of transistor 90 in amplifier J. The output of amplifier K is taken between ground and the collector of transistor 102, and is applied to the integrator circuit L as well as to the threshold detector circuit N.

INTEGRATOR CIRCUIT

The integrator circuit L, as schematically illustrated in FIGURE 4, includes an inverter NPN transistor 112, having its emitter connected to ground and its base connected by a resistor 114 to the collector of transistor 102 in circuit K. The collector of transistor 112 is connected through a resistor 116 to the B+ voltage supply source. Circuit L also includes a pair of NPN transistors 118 and 120. Transistor 118 has its collector connected to the collector of transistor 112 and its base connected through a resistor 122 to the switch circuit P, as described in greater detail hereinafter. A diode 124, poled as shown in FIGURE 4, is connected across the collector to emitter circuit of transistor 118. The emitter of transistor 118 is also connected to ground through a resistor 126 and a capacitor 128. Transistor 120 has its emitter connected through a resistor 130 to the junction of capacitor 128 and resistor 126 and, thence, through a single pole, double throw switch SW–2 to the anode of the voltage controlled capacitance device M taking the form of Zener diode 42. Capacitor 128 is relatively large, such as on the order of 100 microfarads, relative to capacitors 34 and 40, and the capacitance of Zener diode 42. Transistor 120 also has its collector connected to a collector of transistor 112 and its base connected through a resistor 132 and the anode-cathode circuit of a diode 134, poled as shown in FIGURE 4, to the threshold detector circuit N, to be described in greater detail hereinafter. Switch SW–2, which is used for calibration purposes, connects the anode of Zener diode 42 with the junction of capacitor 128 and resistor 126. More particularly, switch SW–2 includes a movable contact 127 connected directly to the anode of Zener 42, a stationary contact 129 connected to the junction of capacitor 128 and resistor 126, and a second stationary contact 131. Stationary contact 131 is connected to the junction of series connected resistors 133 and 135, which define a voltage divider circuit connected between ground and the B+ voltage supply source.

THRESHOLD DETECTOR

The threshold detector N, as schematically illustrated in FIGURE 4, preferably takes the form of a Schmitt trigger circuit, including a pair of NPN transistors 136 and 138 having their emitters connected together in common, and then through a resistor 140 to ground. The collector of transistor 136 is connected through a resistor 142 to the B+ voltage supply source and the collector of transistor 138 is connected through a resistor 144 to the B+ voltage supply source. The collector of transistor 136 is also connected to the base of transistor 138 through a resistor 146. The junction of the base of transistor 138 and resistor 146 is connected through a resistor 148 to ground. The input circuit of the threshold detector is taken between ground and the base of transistor 136, which is connected to the collector of transistor 102. The output circuit of the threshold detector is taken between ground and the collector of transistor 138, which collector is connected to the cathode of diode 134 in the integrator circuit L, as well as to the relay driver circuit R and the operational timer O.

OPERATIONAL TIMER

The operational timer O, as schematically illustrated in FIGURE 4, is a linear ramp function generator in the form of an operational DC amplifier having negative feedback and generally comprises PNP transistors 150, 152 and 154; an NPN transistor 156; a negative feedback capacitor 158; and, an output resistor 160. Transistor 150 has its base connected to the collector of transistor 138 in the threshold detector circuit N, and its emitter connected to the B+ voltage supply source. The collector of transistor 150 is connected to the collector of transistor 156. Transistor 152 has its emitter connected to the B+ voltage supply source and its base connected through a variable timing resistor 162 to the junction of resistors 164 and 166, which are connected between ground and the B+ voltage supply source. The collector of transistor 152 is connected through a diode 168, poled as shown in FIGURE 4, to the base of transistor 156. The emitter of transistor 156 is connected to the base of transistor 152 through a capacitor 170. Transistor 156 also has its collector connected through a resistor 172 to the B+ voltage supply source, and its emitter connected to the junction of resistors 174 and 176, which serve as a potential divider connected between ground and the B+ voltage supply source for purposes of lowering the collector voltage of transistor 152. Transistor 154 has its base connected to the collector of transistor 156 and its emitter connected to the B+ voltage supply source. The collector of transistor 154 is connected to ground through the output resistor 160. The junction of resistor 160 and the collector of transistor 154 is connected to the base of transistor 152 through the timing capacitor 158. Also, a capacitor 178 is connected between the junction of resistors 174 and 176 and the collector of transistor 154.

SWITCH CIRCUIT

The switch circuit P, as schematically illustrated in FIGURE 4, includes a Zener diode 180 and an NPN transistor 182. The cathode of Zener diode 180 is connected through a resistor 184 to the junction of resistor 160 and the collector of transistor 154. The base of transistor 182 is connected to the anode of Zener diode 180. Transistor 182 also has its emitter connected to ground and its collector connected to the B+ voltage supply source through a resistor 186. Also, the junction of resistor 186 and the collector of transistor 182 is connected through a diode 188, poled as shown in FIGURE 4, to the base of transistor 118 in the integrator circuit L.

RELAY AND RELAY DRIVER

The relay driver circuit R includes a PNP transistor 190 and a single pole, double throw mode switch SW-1. Mode switch SW-1 includes a movable contact 192 and a pair of stationary contacts 194 and 196. Contact 196 is connected to ground and contact 194 is connected to the B+ voltage supply source through a resistor 198. Also, contact 194 is connected to the collector of transistor 138 in the threshold detector circuit N. Transistor 190 has its emitter connected to the B+ voltage supply source and its base connected through a capacitor 200 to the stationary contact 194. Also, the base of transistor 190 is connected to the movable contact 192 of mode switch SW-1 through a resistor 202. The collector of transistor 190 is connected to ground through relay coil CR1-C of relay CR1. A diode 204, poled as shown in FIGURE 4, is connected across the coil to protect transistor 190 from the large inductive surge when relay CR1 deenergizes. Relay CR1 also includes a pair of normally closed contacts CR1-1, which may serve to connect load S across an alternating current voltage source V.

OPERATION

With power applied to the circuit, the buffer amplifier B applies a sinusoidal low frequency, alternating current voltage signal to the impedance bridge circuit C. This signal is applied to the common bases of transistors 50 and 52. During each positive half cycle of the input signal, transistors 50 and 52 are biased into conduction, whereupon current flows from the B+ voltage supply source through one path including bridge arm 10, transistor 50, bridge arm 14 to ground, and through a second path including bridge arm 12, transistor 52 and through bridge arm 16. The bridge circuit is initially balanced by actuating switch SW-2 (FIGURE 4) so that Zener diode 42 is connected from the junction of voltage divider resistors 133 and 135 to the junction of capacitor 40 and resistor 44 in the circuit of FIGURE 2. Variable resistor 26 is then varied so that the bridge is balanced and no output voltage appears between the collectors of transistors 50 and 52. Variable resistor 38 is adjusted to balance out the effective resistance of the sensing plate D reflected into the impedance bridge circuit.

As a pedestrian walks over plate D (FIGURES 12 and 13), the total capacitance between the plate and earth ground increases in value. The value of this total capacitance, however, is on the order of 0.0005 microfarad. As stated previously, the value of capacitor 33 is relatively large, on the order of 0.1 microfarad. Thus, an increase in the value of this small plate capacitance results in a net increase in the capacitance between the collector of transistor 28 and earth ground. Accordingly, the capacitive reactance of arm 16 has decreased, increasing the value of the current flow through arms 12 and 16 with respect to that flowing through arms 10 and 14. The bridge becomes unbalanced and an alternating current voltage of some value appears across the collectors of transistors 50 and 52, which is applied through coupling capacitors 54 and 56 to the AC differential amplifier E. The bridge may be rebalanced by lowering the value of the capacitance of arm 16. In parallel with arm 16 there is provided a capacitor series circuit including capacitor 40, Zener diode 42, as well as capacitor 128 (FIGURE 4). Since the cathode of Zener diode 42 is connected through resistor 44 to the B+ voltage supply source, its capacitance can be changed by varying the value of the potential stored by capacitor 128. Thus, for example, if the direct current voltage stored by capacitor 128 is decreased so as to drive the anode end of Zener diode 42 more negatively, then the voltage applied across the anode to cathode circuit of the diode will increase. As is well known, one characteristic of a Zener diode is that it serves as a voltage controlled variable capacitance device, wherein its capacitance varies inversely with the direct current voltage applied across its anode-cathode circuit. As will become more apparent from the description which follows, the compensation control circuit means, including circuits F, G, H, I, J, K, L, M, N, O and P, serves to lower the voltage stored by capacitor 128 so that the voltage applied across diode 42 increases. This, in turn, decreases the junction capacitance of Zener diode 42. Since diode 42 is in parallel with capacitor 34, the capacitance of bridge arm 16 is decreased. This decrease in the capacitance of arm 16 increases the impedance of that arm so that the bridge is rebalanced. The operation required by the control circuit for applying the necessary control voltage to Zener diode 42 is discussed below.

The reference frequency voltage signal provided by oscillator A is applied through the buffer amplifier B to phase shifting circuit F. Circuit F serves to shift the frequency signal so that it is 90° out of phase and lagging that provided by the oscillator. This is a sinusoidal signal which is applied to the differential squaring amplifier G, which squares up the sinusoidal wave in a symmetrical fashion so as to obtain a square wave output voltage signal, as shown by the wave form $V_G$ in FIGURE 5, which is of the same frequency and is out of phase by 90°, lagging, with respect to the oscillator output voltage, as represented by wave form $V_A$ in FIGURE 5.

Figure 5:
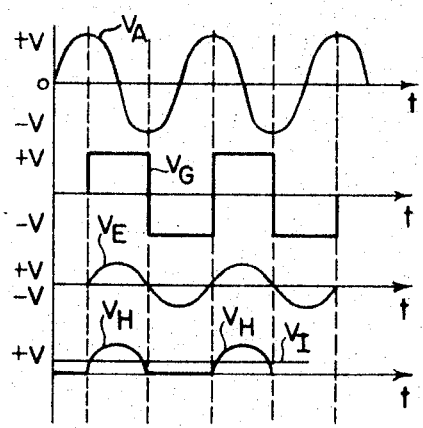
FIGURE 5 is a graph of wave forms of voltage versus time illustrating one aspect of the operation of the invention.

When the bridge is unbalanced, due to the presence of a pedestrian, its output frequency voltage signal is amplified by an AC differential amplifier and applied to the demodulator H. This signal, as represented by the wave form $V_E$ in FIGURE 5, is shifted in phase by 90° lagging, with respect to that of the oscillator output signal $V_A$. This signal is applied to the demodulator H where it is demodulated with the output from the differential squaring amplifier G. With reference to FIGURE 3, it will be noted that the output from amplifier E is applied to the bases of transistors 62 and 64 so that an output voltage of the same frequency is obtained across the output circuit of the differential amplifier, as taken between the collectors of transistors 62 and 64. However, the output from amplifier G, which is of the same frequency as the output from amplifier E and of the same phase (since both are shifted 90° in the same sense with reference to the output from the oscillator A), is applied to the base of demodulating transistor 60. Accordingly, during each negative half cycle of the output signal from amplifier G, transistor 60 is forward biased into conduction to short circuit the collectors of transistors 62 and 64. Accordingly, only the positive alteration of the output voltage of differential amplifier 58 will appear across the output circuit of demodulator circuit H, as indicated by wave form $V_H$ in FIGURE 5. This signal is applied through resistors 86 and 88 to the filter capacitor 85 which serves to filter the signal and provide a direct current voltage, as represented by the wave form $V_I$ in FIGURE 5. This voltage is amplified by the DC differential amplifier J and the output voltage appearing across the collectors of transistors 90 and 92 is a differential voltage signal directly proportional to the capacitive change. This differential signal is again amplified by DC amplifier K (FIGURE 4) which provides an output voltage between ground and the collector of transistor 102, which is directly proportional to the capacitance.

It will now be appreciated that any change in the effective resistance of the detector plate will not be detected by demodulator H and filter I. More particularly, any resistive component of the bridge output voltage will be in phase with the oscillator voltage, as represented by wave form $V_A$ in FIGURE 5. Thus, the resistive component bridge output voltage will be 90° out of phase with respect to the voltage output of amplifier G, see wave form $V_G$ in FIGURE 5. Accordingly, the output voltage of demodulator H will have equal positive and negative alterations, as opposed to that shown in wave form $V_H$, which will be completely filtered out by the filter capacitor 85. Thus, the output voltage of DC amplifier J represents only a capacitive reactance change and not a change in the effective resistance of the detector plate.

The output voltage of the DC amplifier K is applied both to the integrator circuit L as well as to the threshold detector circuit N. In circuit L the output voltage signal of circuit K is inverted by transistor 112 and applied through diode 124 and transistors 118 and 120 to the capacitor 128. Thus, the voltage, as integrated and stored by capacitor 128, is directly proportional to the inductance of the sensing loop. The base to emitter drop of transistor 112 serves to maintain the collector voltage of transistor 102 at some reference value, such as around 1 volt. When the presence of a pedestrian is detected, an increased voltage is applied to the base of transistor 112, attempting to discharge capacitor 128. As discussed previously, when the voltage across capacitor 128 is decreased, there will result an increased voltage drop across the Zener diode 42, thereby decreasing its capacitance. By decreasing the capacitance of Zener diode 42, the bridge is rebalanced and a detected pedestrian is tuned out. However, capacitor 128 is not permitted to discharge to rebalance the bridge circuit until forward biasing potentials are applied to transistor 118 or 120, both located in parallel discharge paths for capacitor 128.

The output voltage of DC amplifier K is applied between ground and base of transistor 136 in the threshold detector circuit N. Normally, this signal is at some reference value, such as 1 volt, as discussed hereinabove. However, this voltage increases in value upon detection of a pedestrian, and when the value of the increased voltage is sufficient to force transistor 136 into conduction, the collector voltage of that transistor decreases and begins to turn off transistor 138. The regenerative action of the Schmitt trigger coupling forces the transistors to change state so that transistor 138 is reversed biased. Thus, the collector voltage of transistor 138 approaches the value of the B+ voltage supply source to reverse bias transistor 120 in the integrator circuit L. Since transistor 118 is also reversed biased, capacitor 128 is prevented from discharging and therefore cannot at this time serve to rebalance the bridge circuit.

The output voltage of the threshold detector circuit N is taken between ground and the collector of transistor 138 and is also applied to the relay driver circuit R. Since the collector voltage of transistor 138 is approaching the value of the B+ voltage supply source, its voltage is reflected through resistor 202 to the base of transistor 190 in relay driver circuit R to reverse bias this transistor, and thereby deenergize relay CR1. Accordingly, relay contacts CR1–1 open and remain open until transistor 190 is forward biased.

The positive collector voltage of transistor 138 is also applied to the base of transistor 150 in the operational timer O to reverse bias this transistor. This permits the operational timer to commence its timing function. Previous to a pedestrian detection, transistor 150 is forward biased since the output voltage of the threshold detector is at some value approaching ground potential. Thus, in this condition transistor 150 applies substantially a B+ voltage signal to the base of transistor 154 so that this transistor is reversed biased. Accordingly, the output voltage across 160 is substantially at ground potential. Thus, the negative side of capacitor 158 is referenced to ground potential and the capacitor is charged by the current flowing through the emitter to base of transistor 152. The value of the charge stored by capacitor 158 is, therefore, essentially the value of the B+ potential minus the voltage drop between the emitter and base of transistor 152.

Figure 6:
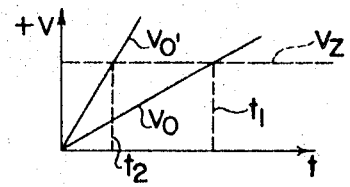
FIGURE 6 is a graph of wave forms of voltage versus time illustrating another aspect of the operation of the invention.

When transistor 150 becomes reversed biased, upon detection of a pedestrian, transistor 154 becomes conductive. A potential is developed across the adjustable timing resistor 162 and the value of this potential is determined by the potential stored by capacitor 158 as well as the setting of the potential divider comprised of resistors 164 and 166. Capacitor 158 commences to discharge through resistors 162, 164 and output resistor 160, thereby slightly decreasing the potential stored by the capacitor. As the value of the potential stored by the capacitor decreases, transistor 152 begins to conduct. Current flows from the B+ voltage supply source through the emitter to collector of transistor 152 to the base of transistor 156 through diode 168, causing transistor 156 to conduct. As transistor 156 begins to conduct, the potential appearing on its collector decreases toward ground potential. As this occurs, transistor 154 begins to conduct more heavily. Current, therefore, commences to flow from the emitter to collector of transistor 154, whereupon a voltage begins to build up across the output resistor 160. This voltage increase increase across resistor 160 lifts the potential on the negative end of capacitor 158 to a point above ground potential. Since the voltage across capacitor 158 cannot change instantaneously, the potential at the positive end of the capacitor is also raised instantaneously the same amount as on the negative end. This tends to turn off transistor 152, 156 and 154. Capacitor 158 then discharges through resistors 162, 164 and 160. Again, transistors 152, 156 and 154 begin to conduct, applying more potential across the output resistor 160. The circuit continues to function in this manner so that for a square wave input a linear ramp function is produced across resistor 160. This voltage increases in a linear manner with elapsed time from ground potential toward the value of the B+ voltage supply source, as indicated by the wave form $V_O$ illustrated in FIGURE 6. So long as the operational timer O is not reset, as by a momentary application of a positive signal from the output circuit of threshold detector N to the base of transistor 150, this linear ramp function will continue until transistor 154 is completely saturated. The slope of the wave form of the output voltage, as represented by wave form $V_O$ in FIGURE 6, is determined by the adjustment of resistor 162. If the resistance of resistor 162 is varied to the point that it is substantially zero resistance, the output voltage will very quickly approach the value of the B+ voltage supply source, as indicated by wave form $V_O'$ in FIGURE 6.

The output voltage of operational timer O is applied to Zener diode 180. After a predetermined period of time, as represented by $T_1$ in FIGURE 6, the output voltage of operational timer O will obtain a value exceeding the break over voltage, represented by the wave form $V_Z$ in FIGURE 6, of the Zener diode 180. As this occurs, transistor 182 is forward biased into conduction so that its collector potential is referenced to ground potential. As will become apparent from the description which follows, when transistor 182 is forward biased into conduction, the integrator circuit L is actuated so that capacitor 128 may discharge and thereby rebalance the capacitance bridge circuit C to tune out the change in the capacitive reactance of the detector plate. During this predetermined time period, relay CR1 is deenergized to indicate the presence of a detected pedestrian. However, since a detected pedestrian may become stationary over the detector plate, it is necessary to rebalance the bridge circuit after some given period of time so that the circuit can detect additional pedestrians walking over the detection plate. The time period may be adjusted by adjustable resistor 162 to obtain a desired time range, such as from 100 milliseconds to 15 minutes. The minimum time range, i.e., for example, 100 milliseconds, is accomplished by adjusting the variable resistor 162 so that substantially all of the resistance is shunted out and this is normally used only for a pulse mode operation when it is desired to count pedestrians as opposed to obtaining an output signal which has a duration representative of the period of time that a pedestrian is located over the detector plate. For the pulse mode operation, switch SW-1 has its movable contact 192 connected to stationary contact 196. With this adjustment and with the noted adjustment of resistor 162, the bridge circuit is almost immediately rebalanced, as indicated by time $T_2$ in FIGURE 6, which, for example, may occur around 100 milliseconds after the pedestrian has been detected. Also, resistor 202 and capaictor 200 in the relay driver circuit form a time constant circuit permitting the relay to be deenergized for a period of around 100 milliseconds.

After the operational timer O has completed its timing function to forward bias transistor 182 into conduction, the collector of this transistor is referenced to ground potential. Similarly, the base of transistor 118 in the integrator circuit L is also referenced toward the value of ground potential through resistor 122 and the anode to cathode circuit of diode 188. Transistor 118 is therefore forward biased into conduction so that capacitor 128 can discharge through the emitter to collector of transistor 118 and through the collector to emitter of transistor 112 in accordance with the increase in capacitive reactance of the sensing loop. As discussed previously, this decrease in the voltage stored by capacitor 128 increases the voltage applied across Zener diode 42, so that the capacitance of this diode decreases to rebalance bridge circuit C. As the bridge becomes rebalanced, the collector voltage of transistor 102 in the DC amplifier K returns to its reference level of substantially 1 volt, which is not sufficient to maintain the threshold detector circuit N actuated. Accordingly, transistor 138 in the threshold detector circuit reverts to its normally conductive state and again forward biases transistor 120 in the integrator circuit L and also forward biases transistor 190 in the relay driver circuit, thereby energizing relay CR1. The detector circuit is now in condition to detect a succeeding pedestrian.

SECOND EMBODIMENT

Figure 7:
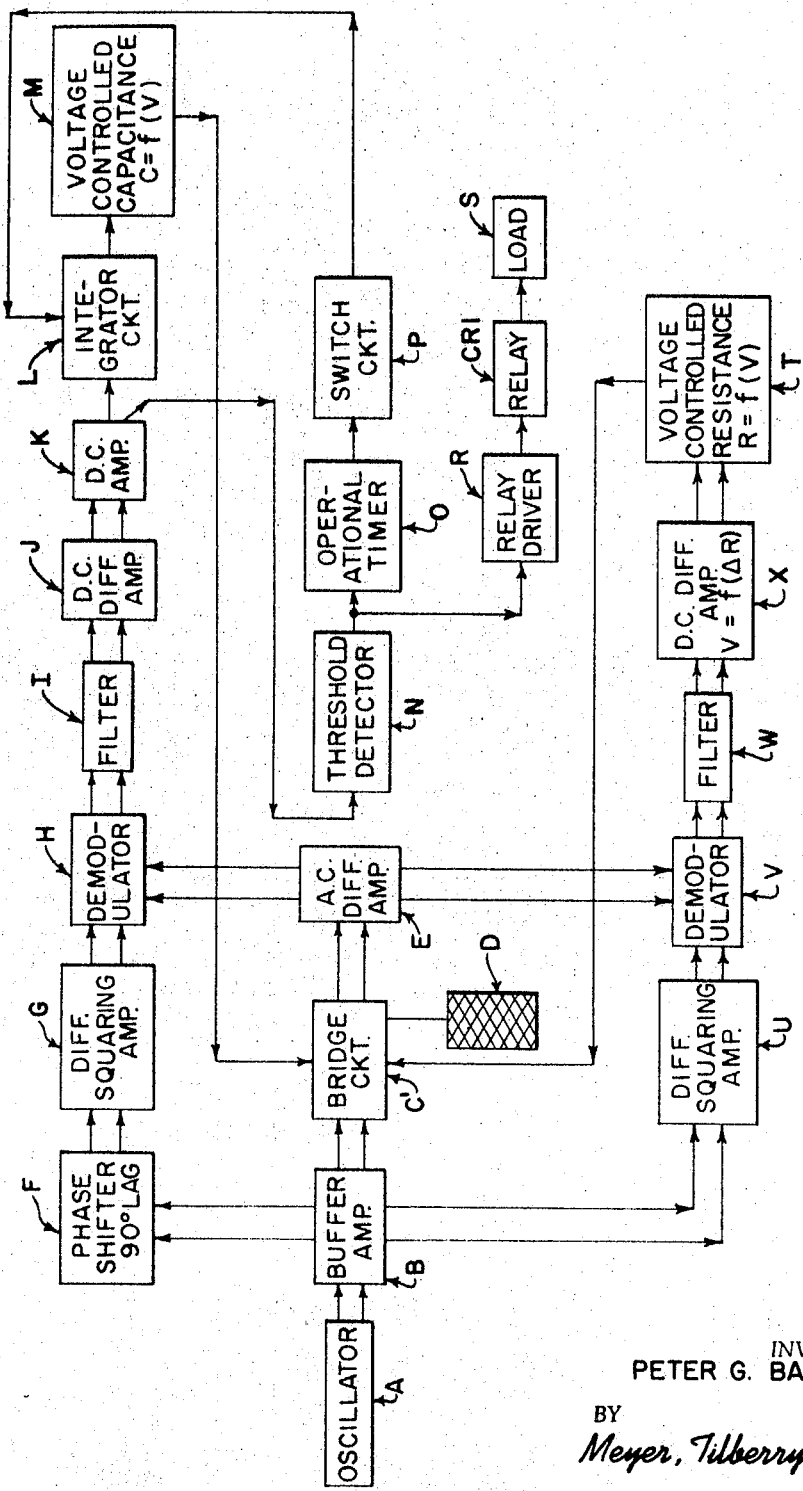
FIGURE 7 is a block diagram illustrating a second embodiment of the invention.

Reference is now made to the block diagram of FIGURE 7, illustrating a second embodiment of the invention, which is quite similar to that illustrated in the block diagram of FIGURE 1, and, accordingly, only the variations therefrom will be described in detail with like components in both figures being identified with like character references. As discussed previously with reference to FIGURE 2, the effective resistance of the sensing plate D is initially balanced out with a manually adjustable resistor 38 located in arm 14 of the impedance bridge. In accordance with this second embodiment of the invention, resistors 36 and 38 are eliminated and, instead, bridge circuit C', to be discussed in greater detail hereinafter with reference to FIGURE 8, includes a voltage controlled variable resistance device shown as block T in FIGURE 7. In addition, this second embodiment of the invention includes a second differential squaring amplifier U which serves the same function as the differential squaring amplifier G discussed in detail with reference to FIGURE 1. The output of the differential squaring amplifier U is coupled to the output of the AC differential amplifier E. The demodulator V is constructed in the same manner as the demodulator H, discussed in detail hereinbefore with reference to FIGURE 4. The output circuit of demodulator V is coupled to a filter circuit W, which takes the same form as filter I discussed in detail hereinbefore with reference to FIGURE 3. The output of filter W is coupled to the input circuit of a second DC differential amplifier X, which takes the form as discussed hereinbefore with reference to the differential amplifier J illustrated in FIGURE 3. The output of the differential amplifier X is applied to the voltage controlled resistance device T.

The impedance bridge circuit C', as schematically illustrated in FIGURE 8, is quite similar to bridge circuit C illustrated in FIGURE 2 and, accordingly, only the variations therefrom will be described in detail with like character references being used in both figures for identifying like components. As will be appreciated from a comparison with FIGURE 2, FIGURE 8 differs by its elimination of resistors 36 and 38, and by its addition of a voltage controlled variable resistance device T, which includes a field effect transistor 210, as well as a resistor 212 and a pair of capacitors 214, 216 and a resistor 218. The field effect transistor 210 has source electrode 220 connected to the collector of transistor 25 through resistor 212, and its drain electrode 222 connected to the base of transistor 25 as well as to the C+ voltage supply through resistor 27. Thus, electrodes 220 and 222 are in parallel with resistors 31 and 32 in the emitter circuit of transistor 25. The gate electrode 224 of the field effect transistor 210 is connected to the junction of capacitors 214 and 216 which form a series circuit between ground the common connection between basis of transistors 50 and 52. Resistor 218 is connected between the junction of capacitors 214 and 216 and amplifier X. Amplifier X, as discussed hereinbefore, is constructed as DC differential amplifier J illustrated in FIGURE 3. Thus, with reference to FIGURE 3, amplifier X includes a resistor 98 taken between ground and the collector of transistor 92. The output of amplifier X is taken across resistor 98 and, accordingly, only one lead is taken from amplifier X, at the collector of transistor 92, and this lead extends to resistor 218 in the circuit shown in FIGURE 8.

OPERATION

Bridge circuit C', as illustrated in FIGURE 8, is initially balanced so that no output frequency signal is obtained across its output circuit, as taken between the collectors of transistors 50 and 52, by adjusting the value of adjustable resistor 26 in arm 14. The effective resistance of the sensing plate, such as the leakage resistance to earth ground, will change in value with variation in temperature and moisture as well as other conditions, such as the type of cable connection to the detector circuitry and the dielectric medium involved. Accordingly, the effective resistance is an unstable and unpredictable parameter. The variations in the effective resistance unbalance the bridge, and the bridge is rebalanced by applying a voltage between ground and the gate electrode 224 of the filed effect transistor 210. As is well known, the resistance between the source electrode and the drain electrode of a field transistor varies in proportion to the voltage applied to the gate electrode. Accordingly, if the effective resistance of the detector plate D has varied in value, the bridge is rebalanced by a compensating change of the resistance in arm 14. This may be accomplished by applying a voltage proportional to the resistance change to the field effect transistor to vary the resistance between the source and drain electrodes.

When the effective resistance of the detector plate D varies, the bridge circuit C becomes unbalanced. Accordingly, an output frequency signal is provided across the output circuit of bridge circuit C'. Any variation in the capacitive reactance is sensed by demodulator H and filter I, described hereinbefore. Variations in the effective resistance are sensed by the demodulator V and filter W. A change in effective resistance is reflected into the bridge as an amplitude change in phase with the oscillator signal. Thus, the amplified bridge output voltage, as represented by the wave form $V_E$, in FIGURE 9, due to this resistive component is in phase with the oscillator frequency signal, represented by wave form $V_A$ in FIGURE 9. The output of oscillator A is applied to the buffer amplifier B and then to the differential squaring amplifier U, which squares up the sinusoidal wave in a symmetrical fashion, as shown by the wave form $V_U$ in FIGURE 9. The demodulator circuit V is similar to the demodulator circuit H, described in detail hereinbefore with reference to FIGURE 3. The output voltage of the demodulator circuit V is an alternating signal of positive pulsations, as represented by the wave form $V_V$ in FIGURE 9. In the same manner as discussed previously with respect to demodulator H and filter I, the output of demodulator V is applied to a filter W, with the output of the filter taking the form of a direct current voltage, as represented by wave form $V_W$ in FIGURE 9. This direct current voltage is then amplified by the DC differential amplifier X, which takes the form of amplifier J illustrated in FIGURE 3. The output of this differential amplifier is taken at the collector of transistor 92 (see FIGURE 3) and is a direct current voltage signal directly proportional to the change of the effective resistance of the sensing loop. This signal is then applied to the field effect transistor 210, as illustrated in FIGURE 8, acting as a voltage controlled variable resistance to rebalance the bridge circuit. Accordingly, the detector system illustrated in FIGURE 7 serves to rebalance the bridge as variations in the effective resistance occur. Thus, the system detects the presence of pedestrians only by responding to variations in the capacitive reactance. The operation of this phase of the system has been described hereinbefore in detail with reference to the embodiment shown in FIGURE 1.

The invention has been described in connection with a particular preferred embodiment but is not limited to same. Thus, whereas changes in capacitive reactance are compensated for by a capacitance device located in the same bridge arm as the detector plate, it will be appreciated that the compensation may be obtained with a capacitive reactance located in another bridge arm. Other modifications may be made without departing from the scope and spirit of the present invention as defined by the appended claims.

I claim:
1. An object detection system comprising:
  detector means having a variable capacitance with respect to earth ground and which capacitance changes in value in a given direction in response to the presence of an object;
  oscillator means for providing a reference frequency voltage signal with respect to earth ground;
  a normally balanced capacitance bridge having four bridge arms, each said bridge arm having a pair of terminals points respectively connected to at least two other bridge arms, and at least three capacitance means each having a first and second terminal, said three first terminals being respectively coupled to different ones of said terminal points, and said three second terminals being connected in common, an input circuit means coupled to said oscillator means for receiving said reference frequency voltage signal and an output circuit means for carrying an output frequency voltage signal representative of a bridge unbalanced condition;
  said detetcor means being coupled to one of said terminal points of said bridge so that said bridge output circuit carries a said output frequency voltage signal when said variable capacitance changes in value in said given direction;
  compensating means coupled to one arm of said bridge for, upon being actuated, returning said bridge to a balanced condition; and
  compensating control circuit means coupled to said bridge output circiut and to said compensating means for actuating said compensating means to return said bridge to a balanced condition in response to a said bridge output frequency voltage signal.

2. An object detection system as set forth in claim 1, wherein said detector means includes electrically conductive means electrically spaced from a reference level of earth ground potential by a dielectric medium.

3. An object detector system as set forth in claim 2, wherein said electrically conductive means generally defines a plane extending substantially parallel with the plane of earth ground.

4. An object detector system as set forth in claim 3, wherein said electrically conductive means includes a wire mesh screen.

5. An object detection system as set forth in claim 1 wherein each said bridge arm includes an electronic control means having an input circuit and an output circuit means, said input circuit of two of said electronic control means being connected to said oscillator means, said input circuit of the other two of said electronic control means being adapted to be connected to a voltage supply source, and the output circuit means of each said control means being connected in series with one of said bridge arms.

6. An object detection system comprising:
  detector means having a variable capacitance with respect to earth ground and which capacitance changes in value in a given direction in response to the presence of an object;
  oscillator means for providing a reference frequency voltage signal with respect to earth ground;
  a normally balanced capacitance bridge having four bridge arms, an input circuit coupled between earth ground and said oscillator means for receiving said reference frequency voltage signal and an output circuit means for carrying an output frequency voltage signal representative of a bridge unbalanced condition;
  said detector means being coupled to one arm of said bridge so that said bridge output circuit carries a said output frequency voltage signal when said variable capacitance changes in value in said given direction;
  compensating means coupled to one arm of said bridge for compensating for a said change in value of said variable capacitance to return said bridge to a balanced condition;
  compensating control circuit means coupled to said bridge output circuit and to said compensating means for actuating said compensating means to return said bridge to a balanced condition in response to a said bridge output frequency voltage signal; and,
  phrase shifting means coupled to said oscillator means for shifting said reference frequency voltage signal by 90° and wherein said compensating means includes an electrically controlled variable capacitance device coupled to one of said bridge arms.

7. An object detector system as set forth in claim 6, wherein said electrically controlled variable capacitance device is the same bridge arm to which said detector means is coupled, and wherein said phase shifting means shifts said reference frequency signal so that it is 90° out of phase and lags that of said oscillator means, whereby the direct current voltage signal represents only a change in the capacitive reactance of said detector means with respect to earth ground.

References Cited

UNITED STATES PATENTS

| | | | |
|---|---|---|---|
| 2,708,746 | 5/1955 | Shaw | 340—258 |
| 2,922,880 | 1/1960 | Elam | 328—5 |
| 2,929,998 | 3/1960 | Diehl | 330—29 |
| 2,983,852 | 5/1961 | Gray | 328—5 X |
| 3,044,694 | 7/1962 | Davidson et al. | |

JOHN S. HEYMAN, Primary Examiner

U.S. Cl. X.R.

323—75; 328—208; 330—14; 331—65, 138; 340—258; 350—29